Patented Nov. 13, 1945

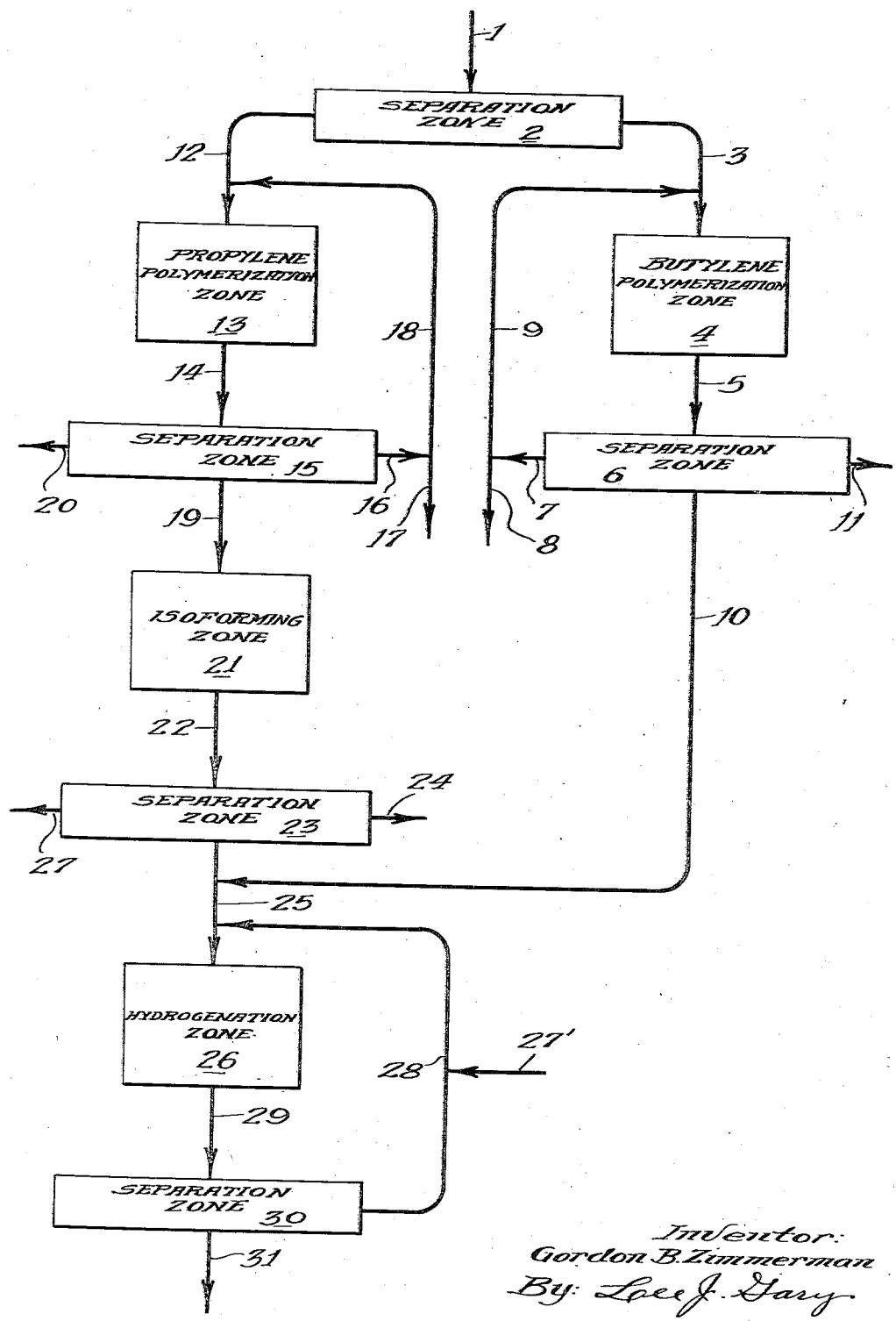

2,388,942

UNITED STATES PATENT OFFICE 2,388,942

CONVERSION OF HYDROCARBONS

Gordon B. Zimmerman, Chicago, Ill., assignor to Universal Oil Products Company, Chicago, Ill., a corporation of Delaware Application April 17, 1944, Serial No. 531,345

3 Claims. (Cl. 260—683.6)

This is a continuation-in-part of my copending application Serial No. 396,142 filed May 31, 1941.

This invention relates to an improved process for the conversion of normally gaseous hydrocarbons into normally liquid hydrocarbons of high antiknock value.

It has heretofore been proposed to polymerize normally gaseous hydrocarbons containing 3 and 4 carbon atoms per molecule in the presence of suitable catalysts to produce normally liquid polymers. These polymers may be hydrogenated in the presence of suitable catalysts to produce a substantially saturated product.

It has also heretofore been proposed to treat olefin-containing hydrocarbon liquids in the presence of suitable olefin isomerization catalysts under conditions to effect isomerization of the olefins with a minimum production of normally gaseous products to produce a distillate product of high antiknock value, which latter operation is now known in the art as "isoforming."

When olefinic gases containing 3 carbon atoms per molecule are polymerized and the resultant polymers are subjected to isoforming, the final product, after hydrogenation, will have a higher octane value than the original polymers. Contrary to expectations, however, when polymers formed by the polymerization of olefinic gases containing 4 carbon atoms per molecule are treated in a similar manner; that is, isoforming and hydrogenation, the final product will have a lower octane value than when the polymers are hydrogenated without prior isoforming. The reduction in octane value of the latter isoformed polymers is an unexpected result and is contrary to what one would predict. Based on these discoveries I now propose a process for the treatment of olefinic gases containing 3 and 4 carbon atoms per molecule in order to produce a final product of high octane value.

In one specific embodiment, the present invention comprises separating normally gaseous olefinic hydrocarbons into a fraction containing 3 carbon atoms per molecule and a fraction containing 4 carbon atoms per molecule, catalytically polymerizing the fraction containing 4 carbon atoms per molecule, separately catalytically polymerizing the fraction containing 3 carbon atoms per molecule, isoforming the polymers produced by the last mentioned polymerization, and catalytically hydrogenating the isoformed products and the polymers produced by said first mentioned polymerization.

The invention will be further illustrated in connection with the following description and the attached flow diagram drawing which illustrates one specific operation of the process, but should not be construed as unduly limiting the invention.

The charging stock is introduced to the process through line 1 and is supplied to separation zone 2, which may comprise one or a plurality of conventional fractional distilling and/or absorbing and stripping zones. If the charging stock contains hydrocarbons of lower and/or higher boiling points than the 3 and 4 carbon atom hydrocarbons, the lighter and/or heavier boiling products may be separated by conventional means, not illustrated, and removed from the process. In separation zone 2, hydrocarbons containing 3 carbon atoms per molecule are separated by means of fractional distillation from those containing 4 carbon atoms per molecule.

The hydrocarbons containing 4 carbon atoms per molecule are removed from the separation zone through line 3 and directed to butylene polymerization zone 4, wherein the butylenes are polymerized in the presence of any suitable catalysts. These catalysts are well known in the art and include, among others, phosphoric acid, sulphuric acid, aluminum chloride, preferably in conjunction with hydrogen chloride, and boron fluoride. The exact conditions of operation to be employed in this step will depend upon the composition of the charging stock and upon the particular degree of polymerization desired, but in general, with phosphoric acid and particularly with a precalcined mixture of phosphoric acid and kieselguhr, will range from about 300° to about 550° F. at a superatmospheric pressure of about 200 to about 1500 pounds, or thereabouts, per square inch. Any suitable type of apparatus may be employed and the particular one chosen for this purpose will depend upon the characteristics of the particular catalyst employed. These are well known in the art at the present time and no novelty for the polymerization process or apparatus per se is claimed in this invention.

The products from zone 4 are directed through line 5 to separation zone 6, which may comprise one or a plurality of suitable fractionating or distilling zones whereby the products may be separated into a fraction containing unconverted 4 carbon atom hydrocarbons, a polymer fraction boiling substantially within the range of gasoline and any higher boiling overpolymerized products. The 4 carbon atom hydrocarbons are removed through line 7 and may be withdrawn from the process through line 8 or all or a regulated portion thereof may be recycled through lines 9 and 3 to polymerization zone 4. The polymers of gasoline boiling range are withdrawn through line 10 for further treatment as will subsequently be described. The higher boiling overpolymerized products may be removed through line 11 from separation zone 6.

The hydrocarbons containing 3 carbon atoms per molecule separated in zone 2 are removed therefrom through line 12 and are directed to propylene polymerization zone 13. Polymerization zone 13 may be of the same or different construction as polymerization zone 4 and may contain the same or different type of catalysts. The conditions to be employed in the polymerization of the propylene are likewise well known and, in general, with phosphoric acid containing catalysts, will range from about 350° to about 550° F. at a superatmospheric pressure of about 200 to about 1500 pounds or thereabouts.

The products from polymerization zone 13 are directed through line 14 to separation zone 15, which likewise may comprise one or a plurality of fractionating and distilling zones, whereby the products may be separated therein into a fraction containing unconverted 3 carbon atom hydrocarbons, a fraction containing polymers boiling substantially within the range of gasoline and any higher boiling overpolymerized products.

The unconverted 3 carbon atom hydrocarbons are removed through line 16 and may be withdrawn from the process through line 17 or all or a regulated portion thereof may be recycled through lines 18 and 12 to polymerization zone 13. Polymers boiling within the range of gasoline are removed through line 19, while the higher boiling overpolymerized products may be withdrawn through line 20.

The polymer products withdrawn through line 19 are directed to isoforming zone 21. In this zone the polymers are contacted with suitable catalysts under conditions to effect isomerization thereof into higher octane value products while at the same time producing only a minor amount of normally gaseous products. Any suitable catalysts having olefin isomerization properties may be employed in this step, among which may be mentioned (1) composites of silica with alumina, zirconia and/or thoria, either alone or in combination with an inert refractory material such as kaolin, fire clay, diatomaceous earth, pumice, etc., (2) naturally occurring clays which preferably are acid or otherwise chemically treated, (3) aluminiferous materials including aluminum oxide, (4) aluminum sulphate-containing catalysts, (5) phosphates of certain metals such as aluminum, magnesium, etc., (6) fluorides of certain metals such as aluminum, magnesium, etc., and (7) phosphoric acid-containing catalysts. It is understood that these are alternative catalysts and are not exactly equivalent in their action.

The conditions utilized in the isoforming operation will depend upon the particular catalyst employed. In general, with catalysts containing silica composited with alumina, zirconia and/or thoria, temperatures of about 800° to about 1100° F., pressures of atmospheric to mildly superatmospheric, and space velocities of about 5 to about 25 volumes of liquid charging stock per hour per unit volume of catalyst may be used. In general, with the phosphate and fluoride types of catalysts, similar pressure and temperature conditions may be employed but the space velocities may be extended to from about 3 to about 100 volumes of liquid charging stock per hour per unit volume of catalyst. The type of apparatus to be employed is conventional and will likewise depend upon the characteristics of the particular catalyst employed.

The isoformed products are directed through line 22 to separation zone 23 which may comprise one or a plurality of fractionating, distilling, absorbing and stripping zones, whereby normally gaseous products may be separated from normally liquid products. The normally gaseous products produced in this isoforming operation are removed through line 24 from separation zone 23. When desired, the hydrogen contained in these gases may be utilized in the subsequent hydrogenation step of the process. The normally liquid products may, when desired, be separated into a fraction of substantially gasoline boiling range and a fraction comprising the higher boiling products. The fraction boiling substantially within the range of gasoline may be directed through line 25 to hydrogenation zone 26. The higher boiling products may be withdrawn through line 27 from separation zone 23. As an alternative method of operation, it is within the scope of the invention to supply the total products from isoforming zone 21 directly to hydrogenation zone 26 without intervening fractionation. In this alternative any hydrogen produced in the isoforming operation will necessarily be available for use in the subsequent hydrogenation step.

The particular case here illustrated indicates that the isoformed products supplied through line 25 are hydrogenated in commingled state with the polymers produced by the polymerization of the butylenes. It is also within the scope of the invention to separately hydrogenate the isoformed products and the butylene polymers and subsequently blend the hydrogenated products.

The products supplied to zone 26 may be hydrogenated therein in the presence of any suitable catalyst, among which may be mentioned reduced nickel composited with a siliceous carrier such as diatomaceous earth, or the oxides or sulfides of chromium, molybdenum, tungsten, etc., either alone or in combination with nickel. Hydrogenation may be effected at a temperature of about 250° to about 450° F. and at superatmospheric pressures of about 150 to about 250 pounds, or more. Hydrogen from an extraneous source may be introduced to the hydrogenating zone through lines 27' and 28. In case the isoformed products and the butylene polymers are to be separately hydrogenated, either the same or different types of catalysts may be used in these steps.

The hydrogenation products are directed through line 29 to separation zone 30, which likewise may comprise one or a plurality of suitable fractionating, distilling, absorbing and stripping zones, whereby unconsumed hydrogen may be separated from the normally liquid products. The unconsumed hydrogen may be recycled from separation zone 30 by way of line 28 to hydrogenation zone 26. The final hydrogenated product of high octane value is recovered from zone 30 through line 31. In the alternative mentioned above, in which the total isoformed products are supplied directly to the hydrogenation operation, any high boiling products may be separated from the final product of substantially gasoline boiling range in zone 30 and removed therefrom by well known means, not illustrated.

The following examples are introduced for the purpose of further illustrating the novelty and utility of the present invention but not with the intention of unduly limiting the same.

All of these examples are based upon polymerizing a butane-butylene fraction in the presence of a solid phosphoric catalyst at a temperature of approximately 375° F. and a superatmospheric pressure of about 1,000 pounds per square inch, and the polymerization of a propane-propylene fraction in the presence of a similar catalyst at a temperature of 425° F. and a pressure of about 1200 pounds per square inch. When employed, the isoforming treatment is effected in the presence of a silica-alumina-zirconia catalyst at a temperature of about 950° F. and a pressure of substantially atmospheric, with a space velocity of approximately 15 volumes of liquid charging stock per hour, per unit volume of catalyst. Hydrogenation of the polymers and/or isoformed polymers is effected in the presence of a nickel catalyst at a temperature of about 350° F. and a superatmospheric pressure of about 300 pounds per square inch.

These examples describe the results obtainable in three different methods of operation as follows: (1) polymerization of propylene and butylenes, either separately or together, and hydogenation of the commingled polymers, (2) polymerization of propylene and butylenes, either together or separately, isoforming the commingled polymers and hydrogenating the isoformed polymers, and (3) separately polymerizing propylene and butylenes, isoforming the propylene polymers and hydrogenating the isoformed propylene polymers in commingled state with the butylene polymers.

It will be noted, from the preceding paragraph, that method (1) is a conventional polymerization and hydrogenation process. Method (2) is the type of operation which one would select based upon the teachings in the prior art. Method (3) is an operation of the type disclosed in the present application.

*Example I*

This example corresponds to method (1) above, and comprises the separate or commingled polymerization of propylene and butylenes, and hydrogenation of the resultant polymers in commingled state. The commingled polymers prior to hydrogenation will have an octane number of about 80 and the final product, after hydrogenation, will have an octane number of about 72.

*Example II*

This example corresponds to method (2) above and comprises the separate or commingled polymerization of propylene and butylenes, commingling the polymers and subjecting the same to isoforming and hydrogenation. The polymers will have an octane number of about 80 which may be increased to 81 upon isoforming. The final hydrogenated product will have an octane number of about 74.

*Example III*

This example corresponds to method (3) above and comprises the separate polymerization of propylene and butylenes, isoforming the propylene polymers, and hydrogenating the isoformed propylene polymers in commingled state with the butylene polymers. The propylene polymers will have an octane number of about 80 which may be increased to about 81 upon isoforming. The butylene polymers will have an octane number of about 81. The final product after hydrogenation will have an octane number of about 78.

It is to be noted from the above examples that the teachings of the present invention as illustrated in method (3) will produce a final product of 78 octane number as contrasted against a final product of 72 octane number which is produced in conventional polymerization and hydrogenation processes and against a final product of 74 octane number which would be produced if one adopted the teachings of the prior art. The increase of 4 octane numbers at this level is extremely important commercially as it may mean the difference in marketing the gasoline as premium grade instead of regular grade.

In addition to the increased octane number obtained in accordance with the present invention, this operation affords economical advantages over the operation of method (2) since only the propylene polymers are isoformed, as contrasted against isoforming both the propylene and butylene polymers as proposed in method (2). This saving is reflected in the smaller size isoforming plant required.

I claim as my invention:

1. A process for the production of more valuable products from $C_3$ and $C_4$ gaseous olefins which comprises separating the $C_3$ olefins from the $C_4$ olefins, separately polymerizing the $C_3$ and $C_4$ olefins, subjecting the resultant polymers of the $C_3$ polymerizing step to the action of an olefin isomerizing catalyst under isomerizing conditions, combining the resultant products of the $C_4$ polymerizing step without subjecting the same to isomerization with the resultant products of the isomerizing step, and hydrogenating the mixture to form a substantially saturated gasoline of high octane rating.

2. The process of claim 1 further characterized in that the olefin isomerizing catalyst comprises a siliceous catalyst.

3. A process for the production of more valuable products from less valuable normally gaseous hydrocarbons containing $C_3$ and $C_4$ olefins which comprises separating from said normally gaseous hydrocarbons a $C_3$ fraction and a $C_4$ fraction, subjecting the $C_3$ and $C_4$ fractions to polymerizing conditions independently of each other to form normally liquid polymers, subjecting resultant gasoline boiling range polymers of the $C_3$ polymerizing step to the action of an olefin isomerizing catalyst under isomerizing conditions, combining resultant products of the olefin isomerizing step with resultant gasoline boiling range polymers of the $C_4$ polymerizing step not subjected to isomerization, and hydrogenating the mixture to form a substantially saturated gasoline of high octane rating.

GORDON B. ZIMMERMAN.